US008919507B2

(12) United States Patent
Parizek et al.

(10) Patent No.: US 8,919,507 B2
(45) Date of Patent: Dec. 30, 2014

(54) DISPLAY STAND CASE TABLE

(75) Inventors: Scott Parizek, Lakeville, MN (US); Jim Sommerville, White Bear Lake, MN (US); Curtis Lindblom, Oakdale, MN (US); Paul Guetter, Hastings, MN (US)

(73) Assignee: Skyline Displays, Inc., Eagan, MN (US)

( * ) Notice: Subject to any disclaimer, the term of this patent is extended or adjusted under 35 U.S.C. 154(b) by 607 days.

(21) Appl. No.: 12/727,099

(22) Filed: Mar. 18, 2010

(65) Prior Publication Data

US 2010/0236454 A1 Sep. 23, 2010

Related U.S. Application Data

(60) Provisional application No. 61/162,003, filed on Mar. 20, 2009.

(51) Int. Cl.

*B62B 1/26* (2006.01)
*G09F 23/08* (2006.01)
*A47B 3/10* (2006.01)
*G09F 21/00* (2006.01)

(52) U.S. Cl.

CPC . *G09F 23/08* (2013.01); *A47B 3/10* (2013.01); *G09F 21/00* (2013.01)
USPC ................ 190/11; 190/12 A; 108/11; 108/14; 108/25; 108/26

(58) Field of Classification Search

USPC .......... 108/33–35, 38, 11–14, 157.15, 25–26; 190/13 R, 12 R, 12 A, 11
See application file for complete search history.

(56) References Cited

U.S. PATENT DOCUMENTS

| | | | | | |
|---|---|---|---|---|---|
| 223,983 | A | * | 2/1880 | Bloch | 190/5 |
| 260,051 | A | * | 6/1882 | Rigby | 190/10 |
| 630,587 | A | * | 8/1899 | Carraway | 190/4 |
| 719,298 | A | * | 1/1903 | Berry | 190/11 |
| 1,514,055 | A | * | 11/1924 | Lawson | 108/100 |
| 1,924,494 | A | * | 8/1933 | Gelinas | 190/12 R |
| 2,406,237 | A | * | 8/1946 | Milkoff | 190/11 |
| 3,049,825 | A | * | 8/1962 | Boyd | 108/35 |
| 3,319,744 | A | * | 5/1967 | Smith | 190/108 |
| 3,543,890 | A | * | 12/1970 | Criswell | 190/12 R |

(Continued)

FOREIGN PATENT DOCUMENTS

| | | | |
|---|---|---|---|
| EP | 0900538 | A2 | 10/1999 |
| WO | WO2006050621 | A1 | 5/2006 |

*Primary Examiner* — Tri Mai

(74) *Attorney, Agent, or Firm* — Craig J. Lervick; Larkin Hoffman Daly & Lindgren, Ltd.

(57) ABSTRACT

A display stand case table provides additional utility for users attending tradeshows, conventions and similar events by providing a work table or display table usable for various purposes. In addition to including a protective housing for transporting displays stands, the case is convertible to a table configuration wherein a carried tabletop is supported by a top edge of the case along with a related hinged lid. In this way, the tabletop is of sufficient size for the display of promotional items, samples, brochures, etc. while also being sufficiently supported. In addition, a secondary lid is provided at an interim location along one side of the case body. The secondary lid can be supported in a substantially horizontal orientation, thus providing an additional supporting shelf. It is contemplated that this secondary support shelf provides a surface to hold or contain audio visual equipment, laptop computers or promotional materials.

20 Claims, 9 Drawing Sheets

(56) References Cited

U.S. PATENT DOCUMENTS

| | | | | |
|---|---|---|---|---|
| 3,557,916 | A * | 1/1971 | Stowell | 190/11 |
| 3,861,504 | A * | 1/1975 | McGraw | 190/110 |
| 3,948,365 | A * | 4/1976 | Gregg et al. | 190/18 A |
| 3,987,737 | A | 10/1976 | Smith | |
| 5,211,288 | A | 5/1993 | Beall | |
| 5,239,934 | A * | 8/1993 | Miller et al. | 108/44 |
| 5,281,019 | A * | 1/1994 | Rodeck | 312/244 |
| 5,379,870 | A * | 1/1995 | Sadow | 190/18 A |
| 5,533,652 | A * | 7/1996 | Levin | 223/84 |
| 5,961,134 | A | 10/1999 | Congleton et al. | |
| 6,189,700 | B1 | 2/2001 | Packrall et al. | |
| 6,257,153 | B1 | 7/2001 | Portugal | |
| 7,101,000 | B2 | 9/2006 | DeMars | |
| D574,150 | S * | 8/2008 | Ross | D3/279 |
| 2002/0043182 | A1* | 4/2002 | Simonin | 108/34 |
| 2002/0134697 | A1 | 9/2002 | Barnett | |
| 2006/0118460 | A1 | 6/2006 | McKenzie et al. | |

* cited by examiner

DISPLAY STAND CASE TABLE

CROSS-REFERENCE TO RELATED CASES

This application claims the benefit of previously filed U.S. Provisional application 61/162,003, filed Mar. 20, 2009 and entitled "Display Stand Case Table".

BACKGROUND

A retractable banner stand is a type collapsible display that is widely used in tradeshows and exhibitions as well as in reception areas and retail stores. An example of a retractable banner stand is disclosed in U.S. Pat. No. 7,337,567 issued to Skyline Displays, Inc.

For tradeshows and exhibitions in particular, multiple banner stands are typically utilized. The banner stands must be shipped or transported to the tradeshows along with all of the promotional materials, display stands, tables, and chairs needed by the exhibitor for the tradeshow. Therefore, it is desirable to provide a transport case that will hold multiple banner stands and which can be quickly and easily convertible into a useable table, counter or workstation, thereby eliminating the need for the exhibitor to separately transport or ship the banner stands and a table, counter or workstation for use at the exhibition. By being able to convert the shipping or transport case into a useable table, counter or workstation for the tradeshow, shipping or transportation costs can be reduced. Additionally, by converting the transport case into a useable item within the tradeshow booth, it eliminates the need for temporarily storing the separate transport cases during the tradeshow until they are needed again for the return shipment.

DETAILED DESCRIPTION

Figure 1:
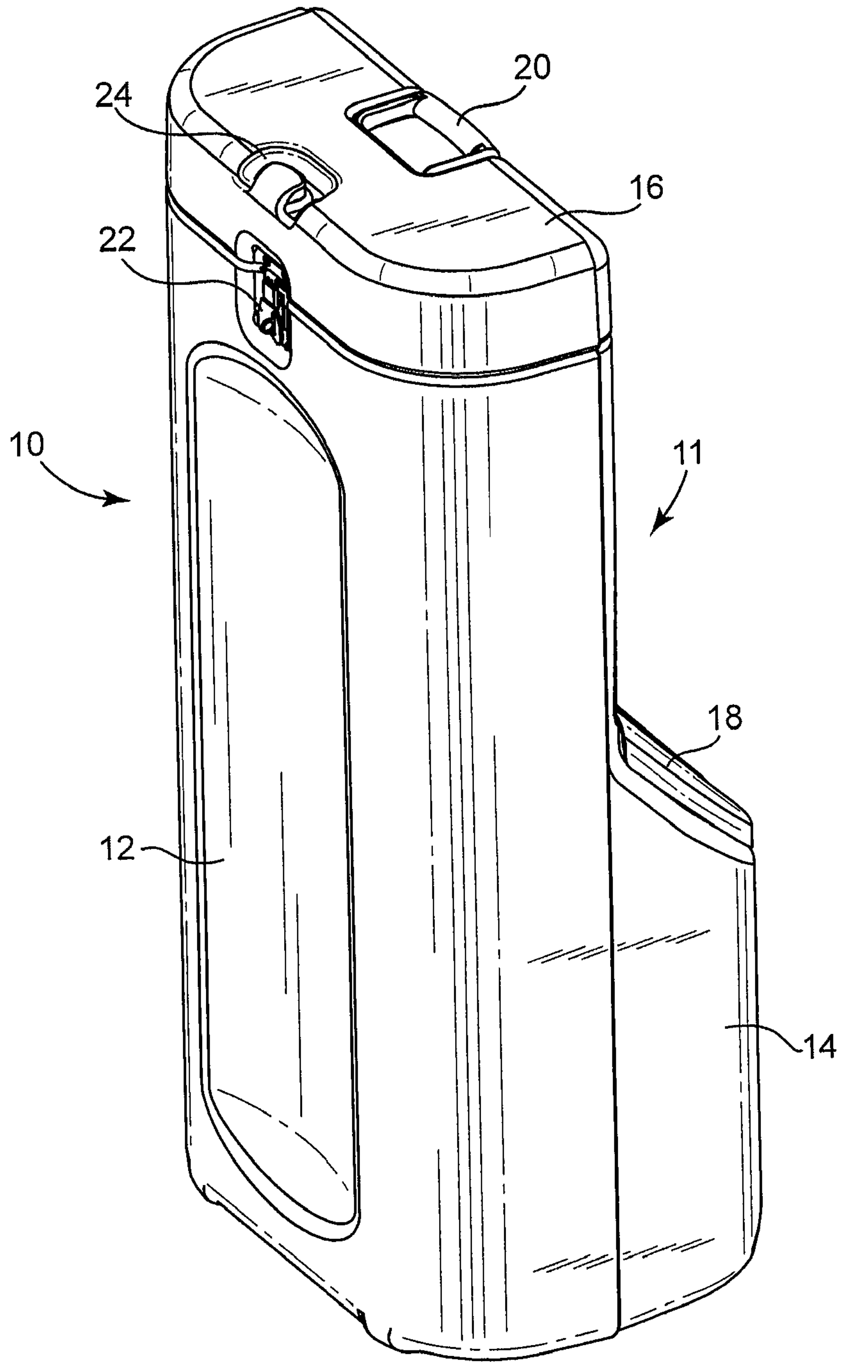
FIG. 1 is a top front perspective view of a banner stand case table in a transport configuration.

Referring now to the drawings, wherein like reference numerals designate identical or corresponding parts throughout the several views, FIG. 1 is a top front perspective view of a preferred embodiment of a banner stand case table designated generally by reference numeral 10. In general, the banner stand case table 10 provides a case for transporting retractable banner stands, display stands or other like items (collectively hereinafter "display stands"), while also providing a display table, counter or workstation (hereinafter collectively "table") once the contents of the case 10 are unpacked. The case 10 preferably provides a hard-shell enclosure to protect and prevent damage to the display stands and other items stored and transported therein. In the preferred embodiment, the case table 10 is configured to transport a number of retractable banner stands. It is understood, however, that the case 10 could be configured to contain and transport any number or type of items for use by exhibitors.

As illustrated in FIG. 1, the case table 10 is displayed in its transport configuration. The case table 10 preferably comprises a unitary body 11 of rigid thermoplastic construction or other suitable lightweight, impact resistant and wear resistant material. The body 11 preferably includes a main housing portion 12, a secondary housing portion 14, a main lid 16 and secondary lid 18. A transport handle 20 is preferably located in the main lid 16. A latch 22 is preferably provided to securely the hold lid 16 in its closed position. A piggyback hook 24 is preferably provided, which allows for the handle of a bag or other article to be hooked onto the case 10 while the case is being rolled to or from the exhibition. The piggyback hook 24 is preferably a simple molded indentation and hook in the lid 16.

Figure 2:
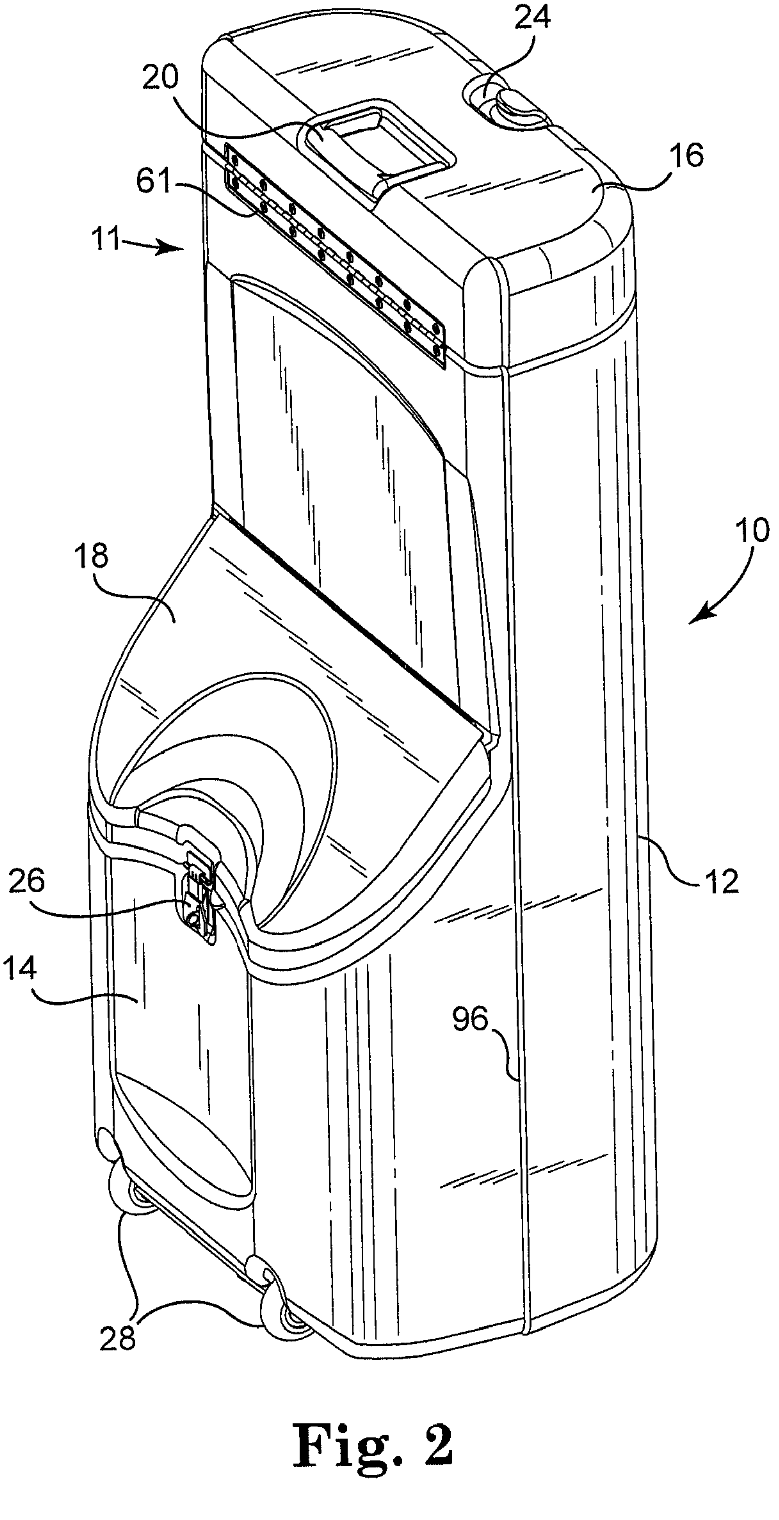
FIG. 2 is a top rear perspective view of the banner stand case table of FIG. 1.

FIG. 2 is a top rear perspective view of the banner stand case table of FIG. 1. A secondary latch 26 is preferably provided to securely hold the secondary lid 18 in a closed position. It should be appreciated that both latch 22 and secondary latch 26 could be configured in several different manners. In the preferred embodiment, the latches 22, 26 allowing use of a padlock (not shown) to secure all items within case table 10.

The case table 10 preferably includes a pair of wheels 28 positioned at the bottom of the secondary housing portion 14 such that when case table 10 is tilted for wheeled transport, the wheels 28 support the body 11 off of the ground surface.

Figure 3:
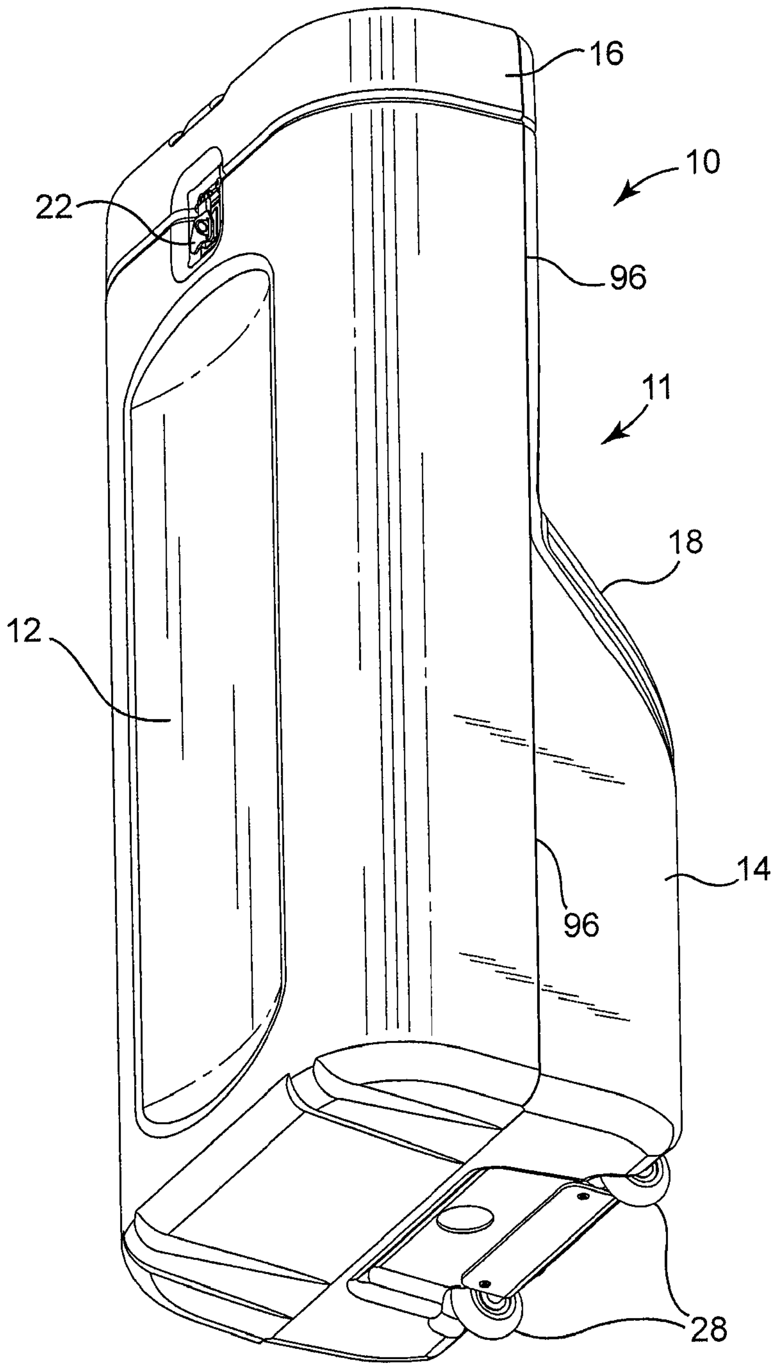
FIG. 3 is a bottom front perspective view of the banner stand case table of FIG. 1.

As generally illustrated in FIGS. 1-3, case table 10, in its transport or closed configuration, provides a generally continuous protective case enclosure. Although not illustrated in these particular figures, it is understood that the interior portion of the case 10 can easily be configured as a single compartment, or multiple compartments. Thus, when configured as a single compartment, the interior can be accessed by either opening main lid 16 or secondary lid 18. Alternatively, two separate compartments could be created, thereby providing isolated chambers within the interior of the case. As yet another alternative, partial separation of the two chambers could be achieved by using a partial divider appropriately configured for the particular application.

Figure 4:
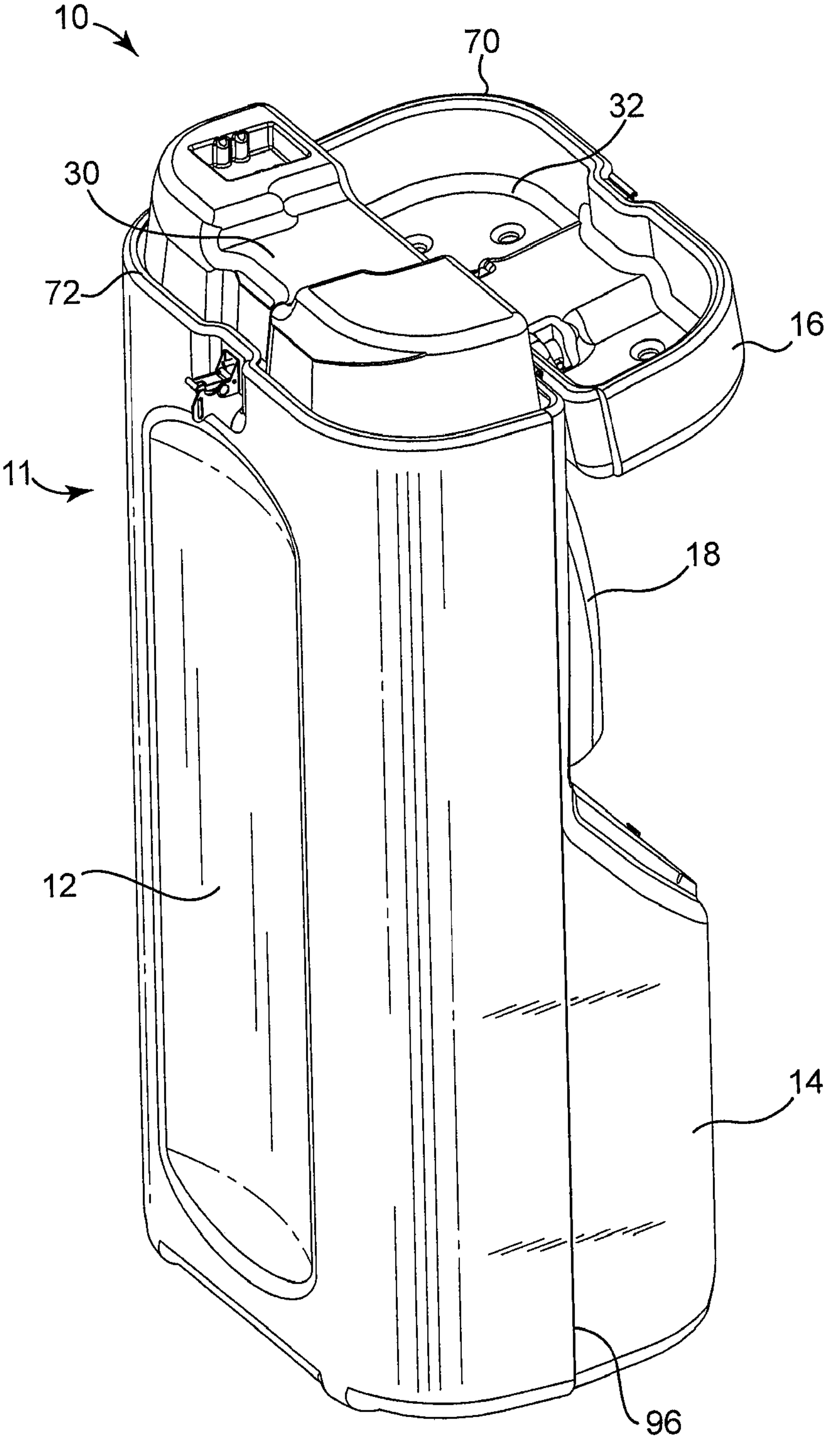
FIG. 4 is a front top perspective view of the banner stand case table of FIG. 1 showing the upper lid open.

Referring now to FIG. 4, a perspective view of case table 10 is shown with main lid 16 opened to expose a first packing element 30. As can be seen in this figure, main lid 16 has a recess 32 which allows a portion of first packing element 30 to extend upwardly. As will be further discussed below, recess 32 and the appropriate configuration of first packing element 30 allows for the packaging of elements which are longer than the height of the display table created by case table 10.

Figure 5:
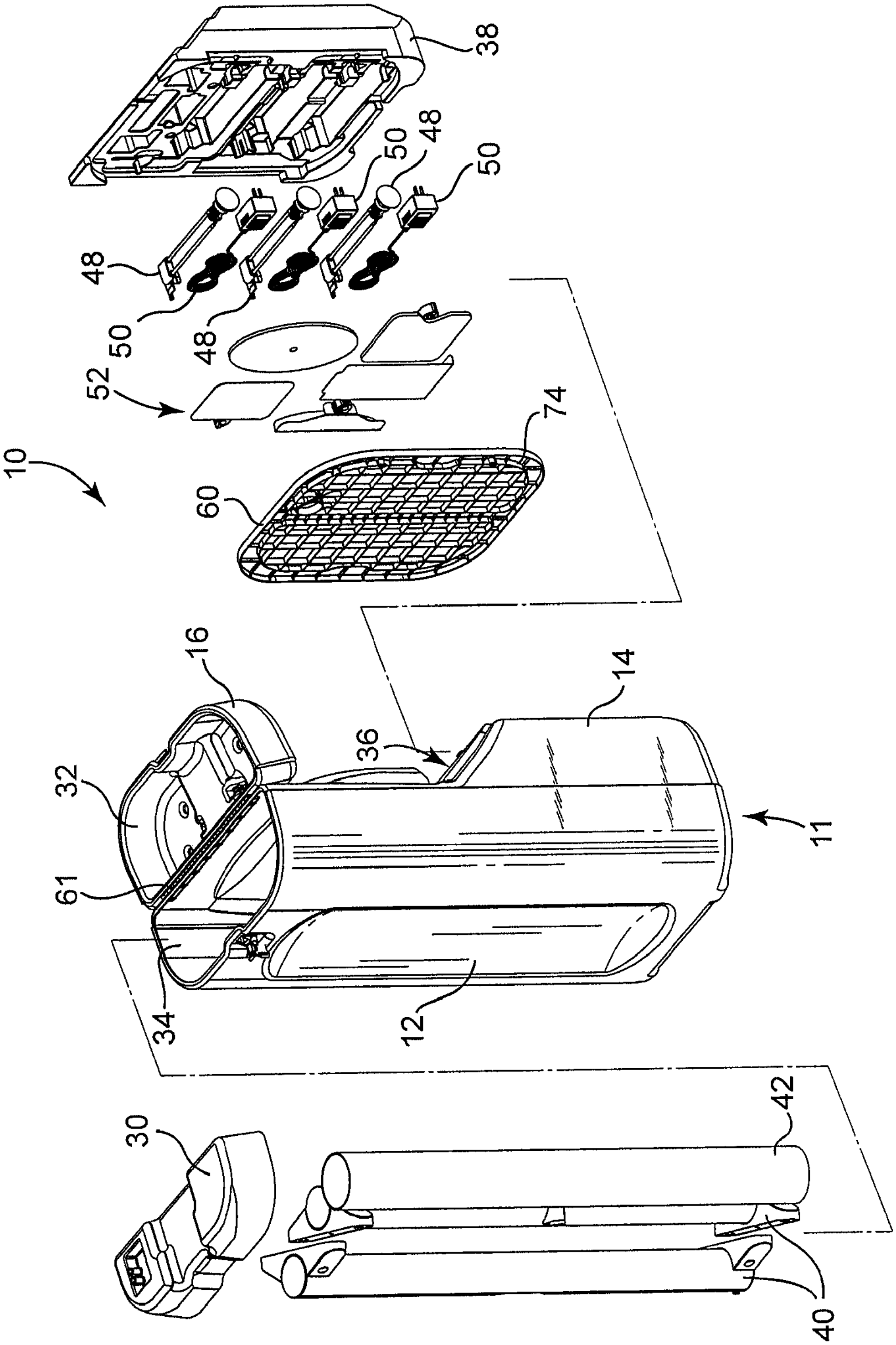
FIG. 5 is an exploded front perspective view of the banner stand case table of FIG. 1 illustrating examples of components and accessories that may be stored and transported in the case for use at a tradeshow or exhibition.

Further details regarding the packing capabilities of case table 10 can be seen by referring to FIG. 5, which is an exploded view showing examples of items that may be stored in the case 10 for use at the exhibition or tradeshow. In the preferred embodiment, the case table 10 is designed to carry a number of retractable banner stands, and associated graphic displays. As examples, case table 10 may be configured to carry two or three Skyline® Exalt™ banner stands manufactured by Skyline Displays, Inc., Eagan, Minn., or any other product or item which can be packed within the interior spaces and wheel transported by an individual.

For illustration purposes only, the display stands comprising a two banner stands 40 and a carrying tube 42 are shown. The carrying tube 42 may be used for housing graphical displays for use in the banner stands and/or for housing a graphic banner 90 (discussed later) for attachment to the case 10 in the display configuration. The display stands 40, 42 are receivable into a main compartment or interior space 34. To secure the display stands during transport to prevent them from moving within the interior space 34, a first packing element 30 is preferably configured to receive the top of the display stands 40, 42 a corresponding second packing element (not shown) disposed in the bottom of the interior space 34 receives the bottom of the display stands. The first and second packing elements are preferably molded of lightweight material that also securely retains the items in position during transport and which cushions provides some level of impact resistance, such as Styrofoam® or other suitable material. As illustrated above in FIG. 4, the first packing element 30 may extend partially into interior space 34 and it may project into the lid recess 32 when main lid 16 is closed.

Also illustrated in FIG. 5 are a number of components may be placed within a secondary compartment or second interior space 36 provided by the secondary housing 14. A third packing element 38 is preferably provided within the interior space 36 to retain accessories and additional components that may be used with the display stands 40, 42 and/or with the case 10 when in the display configuration (discussed later). For illustration purposes only, FIG. 5 shows a plurality of lights 48, electrical cords 50, and a plurality of shelving brackets 52 all retained within third packing element 38 during transport. A tabletop 60 is also preferably received by the third packing element 38 and preferably provides a cover or containing element to enclose the shelving elements 52, electrical cords 50 and lights 48. Once appropriately nested, a single contained insert is preferably provided which is removably received within second interior space 36.

Figure 6:
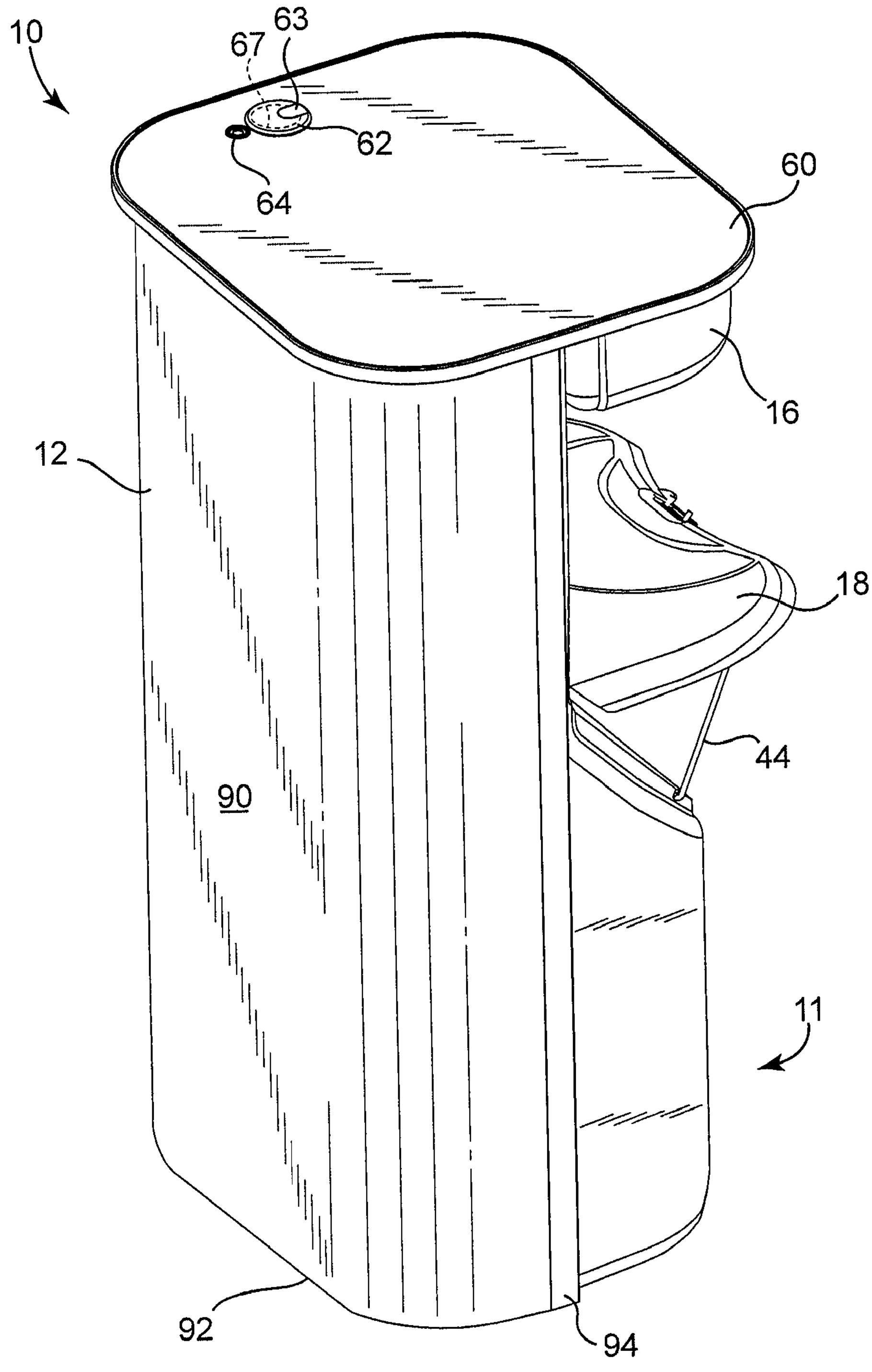
FIG. 6 is a top front perspective view of the banner stand case table of FIG. 1 in a display configuration.
Figure 7:
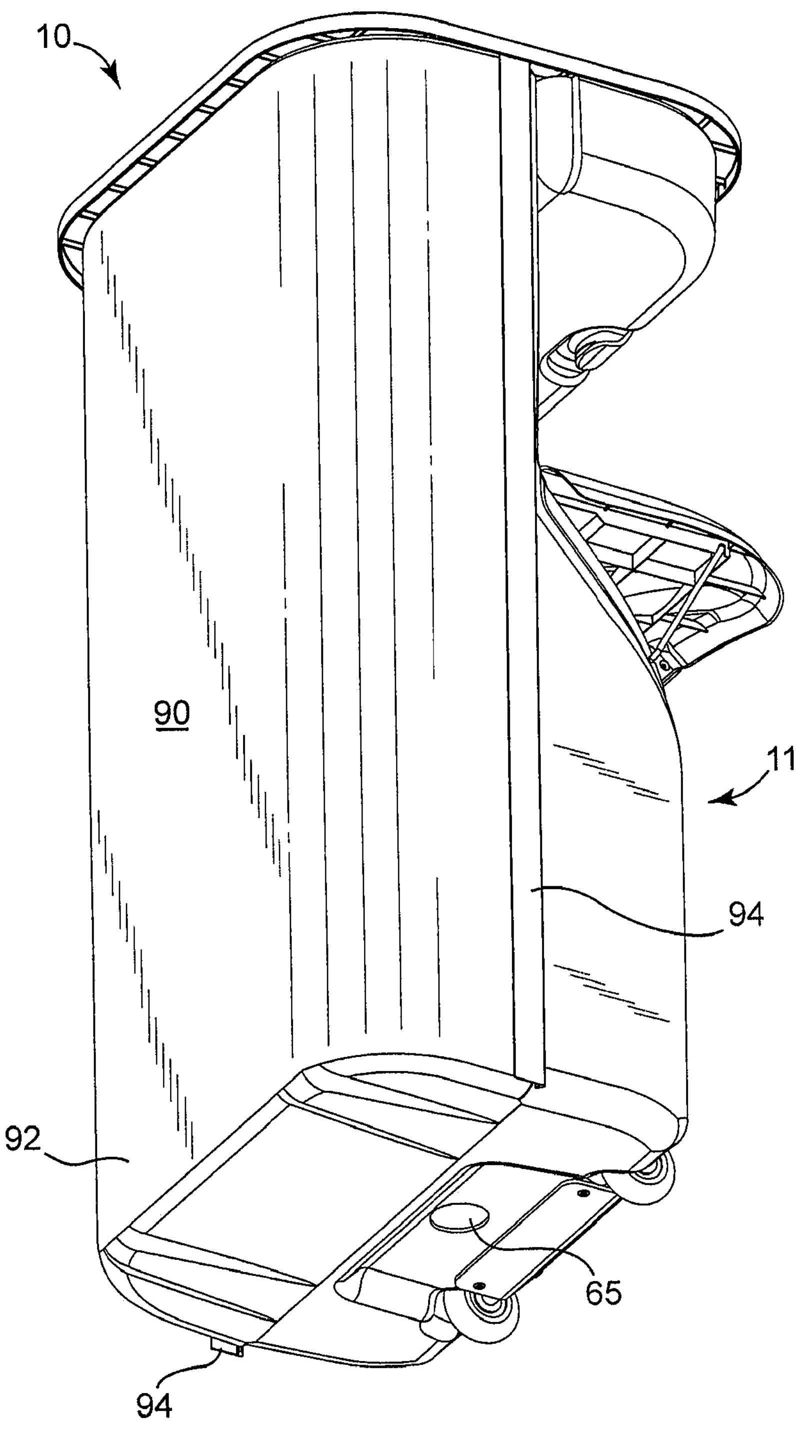
FIG. 7 is a bottom front perspective view of the banner stand case table of FIG. 1 in a display configuration.

FIGS. 6-7 illustrates the case table 10 in a display configuration, wherein a display banner 90 is secured over the exterior face of the main housing portion 12 and wherein a tabletop, counter or workspace 60 is provided. As best illustrated in FIGS. 2 and 5, the main lid 16 is pivotally secured to the main housing portion 12 by a hinge 61. When the main lid 16 is in the fully open position, the peripheral rim 70 (FIGS. 4, 5) of the lid 16 is preferably substantially planar with the peripheral rim 72 of the main housing portion 14 thereby providing a level and substantially stable support surface for the tabletop 60. The underside of the tabletop 60 is preferably configured with a downwardly extending flange 74 that nests or is otherwise received by the interior peripheral rims 70, 72 of the main lid 16 and main housing portion 16 to minimize movement between the tabletop 60 and the supporting rims 70, 72.

Figure 9:
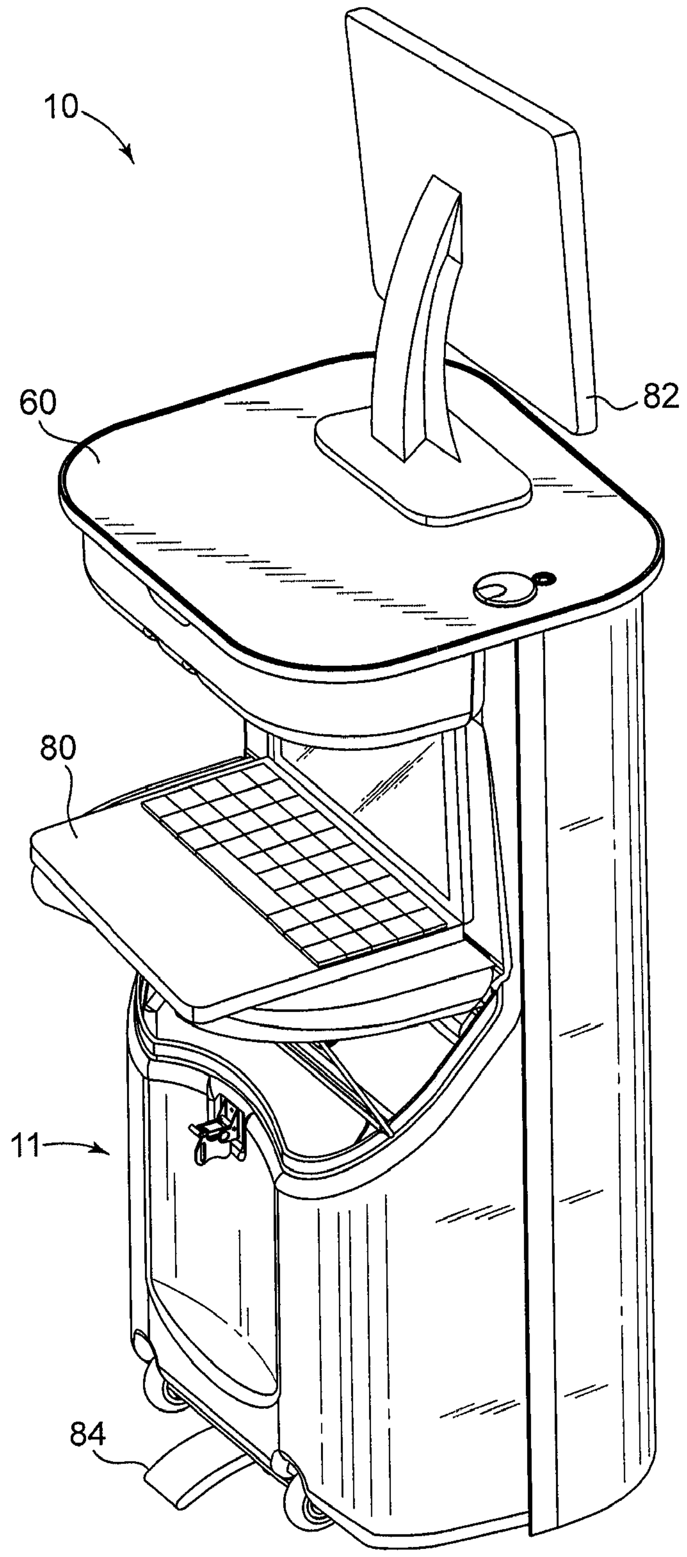
FIG. 9 is a rear top perspective view of the banner stand case table of FIG. 1 in the display configuration and illustrating how the table may be used to support a laptop and monitor, for example.

As also illustrated in FIGS. 6, 7 and 9, the secondary lid 18 may be supported in a substantially horizontal shelf position by support legs 44. The support legs 44 preferably lock the secondary lid in the shelf position to securely support supplies, materials, a computer laptop (FIG. 9), audiovisual devices media or other desired items.

In addition to providing an upper tabletop and lower shelf in the display configuration, the case 10 is also adapted to support a graphics display 90 that covers the outer surface of main housing portion 12. In a preferred embodiment, the graphic display 90 comprises a flexible panel 92 with rigid L-shaped attachment strips 94 extending along opposing ends of the panel 92. The ends of the L-shaped strips 94 are preferably received within grooves 96 (FIGS. 1, 2, 3) extending the height of the main housing portion 12. The flexible panel 92 is preferably a stretch-fabric material, such as Lycra, and is preferably sized such that when the graphic display 90 is placed over the front of the main housing portion, graphic display 90 is taut and substantially wrinkle-free.

Referring again to FIGS. 6, 8 and 9, as previously discussed it is contemplated that the case table 10 may be used when in the display configuration to support laptops, audiovisual equipment, and other electronic devices. Accordingly, the tabletop 60 preferably includes an aperture 67 through which electrical cables and cords may extend. A removable cover 62 with a narrow slotted opening 63 may be provided to substantially cover the larger aperture 61. The cover 62 may be removed to feed through the larger plug ends and then replaced around the thinner cables that pass through the slotted opening 63. Referring to FIG. 7, a bottom aperture 65 may be provided through which a power cord, internet cables or other cables may extend. By providing openings between the two interior chambers 34, 36 the cables can be easily be routed from the floor to related electronic devices on the tabletop 60 or on the secondary lid/shelf 18.

Figure 8:
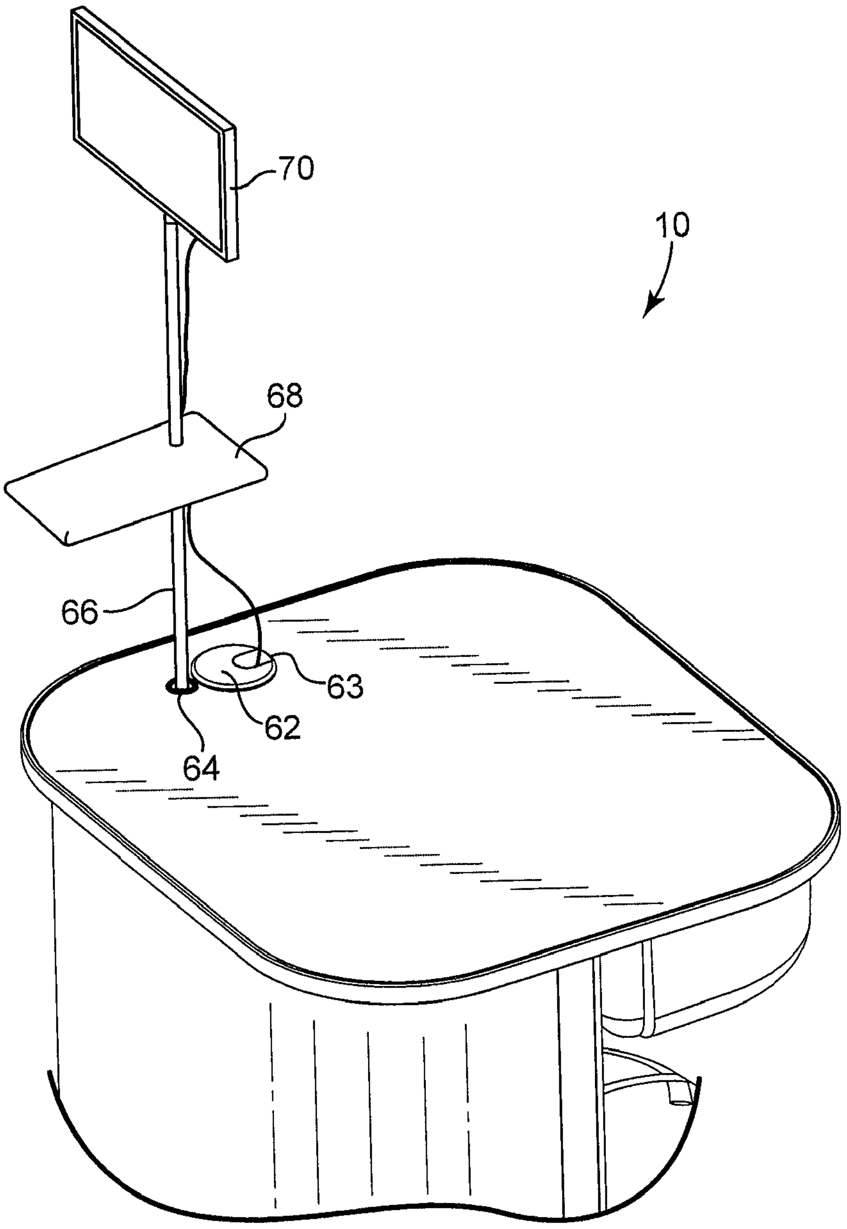
FIG. 8 is an enlarged partial perspective view of the banner stand case table of FIG. 1 in the display configuration and illustrating the use of some of the accessories illustrated in FIG. 5, including a post on which is mounted a shelf or sign.

Referring to FIG. 8, the tabletop 60 also preferably includes a post receptacle 64 for receiving a post 66 to which other accessories may be removably attached, such as a support shelf 68 and a small sign or electrical display 70 or other accessories that may have been stored within the interior spaces 34, 36 as previously described.

Referring to FIG. 9, the case table 10 also preferably includes an extendable support 84 that slidably extends from the underside a bottom side of secondary housing 16 to provide additional lateral support for case table 10 when in its display configuration. When not needed or when the case 10 is being transported, the extendable support 84 is securely stowed.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A display stand case table system for containing and transporting at least one display stand and for providing a table, comprising:

at least one display stand;

a body defining an interior space having a top edge periphery, said interior space configured to receive the at least one display stand;

a lid hingedly attached to said body and movable between a closed position and an open position, said lid having an edge periphery, whereby when said body is supported in a substantially upright orientation and said lid is in said open position, said lid edge periphery and said top edge periphery combined provide a support surface in a substantially horizontal plane; and a table top removably insertable into said interior space and fully supportable upon and covering said support surface, wherein said body has a secondary opening sized to receive the tabletop therethrough and positioned along an exterior wall thereof, the display stand case table system having a related second lid hingedly attached to said body, said second lid movable between a closed position wherein the secondary opening is substantially covered by said second lid and an supporting position wherein said lid is substantially horizontal, thereby creating a support surface.

2. The display stand case table system of claim 1 wherein said table top engages with said lid edge periphery and said top edge periphery to hold said table top in a predetermined position.

3. The display stand case table system of claim 1 wherein the second lid is held in the supporting position place by a bracket positioned between the second lid and the periphery of the secondary opening.

4. The display stand case table system of claim 3 wherein the second lid is further movable to a fully opened position to allow access to the interior of the body through the secondary opening.

5. The display stand case table system of claim 1 wherein the lid is positioned above the secondary opening when the lid is in its open position.

6. The display stand case table system of claim 1 further comprising a pair of wheels positioned at a lower end of the body such that the wheels will not engage a supporting surface when the body is in its upright position but will engage a supporting surface when the body is tilted away from an upright orientation.

7. The display stand case table system of claim 1 wherein the tabletop includes a flange configured to nest with the said lid edge periphery and said top edge periphery.

8. The display stand case table system of claim 1 wherein the tabletop is a single unitary component.

9. A display stand case table system providing the ability to transport a advertising display stand and providing a work table, comprising:

a display stand;

a wheeled body having a housing which is configured to receive the display stand, the housing having a main housing bottom portion supporting the body in a substantially upright orientation, and an opening at one end thereof opposite the bottom portion to allow access to an interior space, the wheeled body further having a secondary opening allowing access to the interior space;

a main body lid hingedly attached to the main housing to allow movement of the lid between a closed position and an open position, the main body lid having a mating edge configured to meet with a peripheral edge of the main housing opening when in the closed position, the mating edge and the peripheral edge further positioned in substantially the same plane when in the open position; and a tabletop removably disposed within the interior space and supported by both the mating edge and the peripheral edge when the main body lid is in the open position, thus providing a work table.

10. The display stand case table of claim 9 further comprising a second lid hingedly attached to the wheeled body adjacent the secondary opening, the second lid movable between a supporting and closed position, wherein the second lid is substantially horizontal when in the supporting position.

11. The display stand case table of claim 9 wherein the main body lid is situated substantially above the second opening when the main body lid is in the open position.

12. The display stand case table of claim 9 further comprising a main latch and a secondary latch wherein the main body lid and the second lid are latchably closable by the main latch and the secondary latch, respectively.

13. The display stand case table of claim 10 further comprising a movable support legs for supporting the second lid in the open position.

14. The display stand case table of claim 9 wherein the main body lid further comprises a piggyback hook for holding additional luggage when in the closed position.

15. The display stand case table of claim 9 further comprising at least one storage insert configured to closely fit within the interior space and contain at least one article for transport.

16. The display stand case table of claim 9 wherein at least one set of wheels are positioned at a bottom end of the body wherein the wheels are positioned so that they contact the floor when the wheeled body is tilted at an angle.

17. The display stand case table of claim 16 further comprising an extendable support coupled to a bottom portion of the main body, the extendable support movable to a supporting position in contact with a support surface to provide additional stability when the case table is in an upright orientation.

18. The display stand case table of claim 9 wherein the tabletop includes a flange configured to nest with the mating edge and the peripheral edge.

19. A display stand case table for securely transporting elongate display stands, while also being configurable as a usable table, the display stand case table comprising:

a wheeled main body configured to be supported by a bottom portion thereof in a substantially upright orientation, the main body having a first opening at a first end thereof opposite the base and a secondary opening at a secondary location, both the first opening and the secondary opening providing access to an interior space within the main body, wherein the interior space is sized to contain the display stands, the first opening having a peripheral edge surrounding the first opening which is contained within a substantially horizontal plane when the main body is in an upright orientation, the main body further comprising a pair of wheels at a second end which is opposite the first end to allow for wheeled movement;

a main lid hingedly attached to the main body to allow movement between a closed position which substantially covers the first opening and encloses the main body, and an open position where the main lid swings to a position above the secondary opening, the main body lid having a mating edge configured to meet with the peripheral edge of the main housing opening when in the closed position, the mating edge and the peripheral edge further positioned in substantially the same plane when in the open position;

a tabletop removably insertable into the interior space via the second opening and removably supported by the mating edge and the peripheral edge when the main body lid is in the open position, the tabletop including at least one flange configured to mate with the mating edge and the peripheral edge to hold the tabletop in a predetermined position; and a secondary lid hingedly attached to the main body adjacent the secondary opening, the second lid movable between an open and closed position, wherein the second lid is further positionable at a substantially horizontal support position by engaging a pair of support legs carried by the secondary lid.

20. The display stand case table of claim 19 wherein the main body has a height smaller than the length of the display stands to be transported therein.

* * * * *